(12) United States Patent
Ogawa et al.

(10) Patent No.: US 7,867,661 B2
(45) Date of Patent: Jan. 11, 2011

(54) FUEL CELL SYSTEM AND METHOD

(75) Inventors: Jumpei Ogawa, Saitama (JP); Chihiro Wake, Saitama (JP); Koichiro Miyata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1193 days.

(21) Appl. No.: 11/492,429

(22) Filed: Jul. 25, 2006

(65) Prior Publication Data

US 2007/0026277 A1 Feb. 1, 2007

(30) Foreign Application Priority Data

Jul. 28, 2005 (JP) ............................. 2005-219225

(51) Int. Cl.
*H01M 8/04* (2006.01)
*H01M 8/12* (2006.01)
(52) U.S. Cl. .................. 429/429; 429/442; 429/444
(58) Field of Classification Search ............... None
See application file for complete search history.

(56) References Cited

U.S. PATENT DOCUMENTS

2004/0072042 A1 * 4/2004 Kim ........................... 429/23
2006/0040150 A1 * 2/2006 Yu et al. ...................... 429/13
2006/0115700 A1 * 6/2006 Kotani et al. ................ 429/25

FOREIGN PATENT DOCUMENTS

| JP | 63-026962 | | 2/1988 |
| JP | 2003-510786 | | 3/2003 |
| JP | 2003-331893 | | 11/2003 |
| JP | 2005-141943 | | 6/2005 |
| JP | 2005276552 A | * | 10/2005 |
| JP | 2006059719 A | * | 3/2006 |
| WO | 01/24296 A1 | | 4/2001 |

* cited by examiner

*Primary Examiner*—Robert Hodge
(74) *Attorney, Agent, or Firm*—Nelson Mullins Riley & Scarborough LLP; Anthony A. Laurentano

(57) ABSTRACT

A fuel cell system and a method for scavenging it are provided. The fuel cell system includes a fuel cell, a fuel gas passage, an oxidant gas passage, a communicating passage, a communicating valve, a monitoring device, a valve controller, a scavenging device and a computing device. The monitoring device monitors a state transition of the fuel cell after a termination of power generation. The valve controller opens the communicating valve when a signal indicative of the state transition meets a predetermined criterion. The scavenging device includes a first scavenging device for the oxidant gas passage, and a second scavenging device for the fuel gas passage. The computing device computes an amount of the oxidant gas required for scavenging according to a system shut off time. The scavenging device conducts scavenging with the amount of the oxidant gas obtained by the computing device.

9 Claims, 10 Drawing Sheets

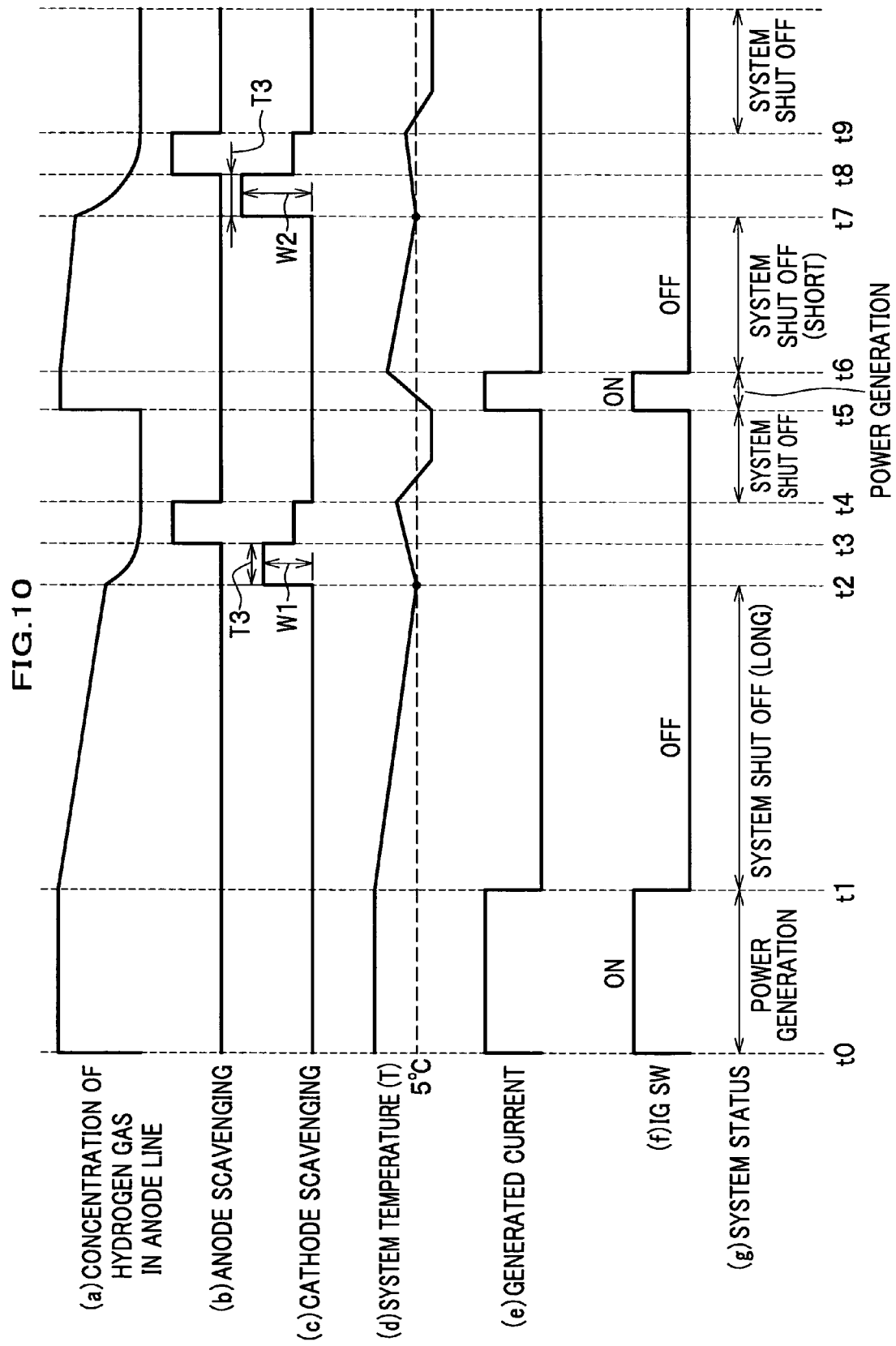

FUEL CELL SYSTEM AND METHOD

BACKGROUND OF THE INVENTION

The present invention relates to a fuel cell system, which can be started up under low temperature condition and a method for scavenging the fuel cell system.

As an example of a fuel cell mounted on an electric vehicle, a fuel cell categorized as a type of Proton Exchange Membrane (PEM) has been generally known, which employs solid polymers as electrolytic membranes. The fuel cell of this type has stacked layers of cells, each of which has an anode and a cathode interposing an electrolytic membrane. When a hydrogen gas and air (oxygen gas) are supplied to the anode and cathode, respectively, they cause an electrochemical reaction, generating power and water.

It is known that when power generation by a fuel cell is terminated, water remains in lines and the fuel cell. If a system including the fuel cell is terminated without taking care of the water, the water will freeze under low temperature condition, such as a cold district or a winter season, which invites a problem that performance in terms of low temperature start-up deteriorates. As one of countermeasures for this problem, it is known that air is introduced into both anode and cathode sides so as to conduct scavenging during a termination of a fuel cell system (see patent document No. 1).

Patent document No1: Examined patent application publication H04-33112 (right side of page 1 line 6 from the bottom)

In a conventional fuel cell system, scavenging is carried out immediately after power generation is terminated. This leads to a problem that a driver experiences uncomfortable feeling due to noise, which continues even after ignition is turned off. In view of this problem, it has been proposed that scavenging should be started to carry out when the fuel cell has reached a given condition, where its temperature has approached some low temperature, for example. In this case, scavenging is carried out for a cathode by supplying a constant amount of air, which is determined in advance, irrespective of hydrogen concentration on the anode side.

However, there has been a problem that an amount of air more than necessary is supplied for scavenging a hydrogen gas remaining in an anode even if its amount is small, so that extravagant power is consumed to drive an air supplier. This is ascribed to the fact that a percentage of the hydrogen gas permeating through an electrolytic membrane from the anode to cathode depends on how long it has elapsed after a termination of the fuel cell system. If scavenging is carried out with a constant amount of supplied air, it is necessary that this amount should be determined so as to cope with a condition where a large amount of hydrogen gas remains in the anode.

SUMMARY OF THE INVENTION

In view of the problem described above, the present invention provides a fuel cell system, which enables a reduction in power consumption.

It is an aspect of the present invention to provide a fuel cell system, which includes a fuel cell, a fuel gas passage, an oxidant gas passage, a communicating passage, a communicating valve, a monitoring device, a valve controller, a scavenging device and a computing device. The fuel cell generates power with reaction between a fuel gas and an oxidant gas. The fuel gas passage provides a passage through which the fuel gas flows. The oxidant gas passage provides a passage through which the oxidant gas flows. The communicating passage is configured to allow the fuel gas passage and the oxidant gas passage to communicate with each other. The communicating valve is configured to open and close the communicating passage. The monitoring device is configured to monitor a state transition of the fuel cell after a termination of power generation. The valve controller is configured to open the communicating valve when a signal indicative of the state transition monitored by the monitoring device meets a predetermined criterion. The scavenging device is configured to scavenge with the oxidant gas. The scavenging device includes a first scavenging device which is configured to conduct first scavenging for the oxidant gas passage, and a second scavenging device which is configured to conduct second scavenging for the fuel gas passage after the first scavenging device is started up. The computing device is configured to compute an amount of the oxidant gas, which is required for the first and second scavenging according to a system shut off-time between a termination of power generation by the fuel cell and a start-up of the first scavenging device. The scavenging device conducts the first and second scavenging with the amount of the oxidant gas obtained by the computing device.

When the communicating valve is opened so as to conduct the first scavenging according to the present invention described above, it is possible to scavenge the oxidant gas passage with the oxidant gas while the fuel gas flows into the oxidant gas passage from the fuel gas passage via the communicating passage. When the second scavenging is conducted, it is possible to scavenge the fuel gas passage with the oxidant gas. Because the concentration of the fuel gas remaining in the fuel gas passage is determined according to the system shut off time, it is possible to supply an appropriate amount of the oxidant gas for scavenging. In this way, it is possible to allow a reduction in power consumed by devices which participate in supplying the oxidant gas.

It may be possible that an amount of oxidant gas to be supplied for the first scavenging is varied according to the system shut off time. This may allow efficient control for the amount of the supplied oxidant gas.

It is another aspect of the present invention to provide a method for scavenging a fuel cell system which includes a communicating passage and a communicating valve so as to selectively allow a fuel gas passage and an oxidant gas passage to communicate with each other. The method includes the steps of: monitoring a state transition of the fuel cell after a termination of power generation; opening a communicating valve so as to open the communicating passage when a signal indicative of the state transition meets a predetermined criterion; computing an amount of an oxidant gas required for first and second scavenging according to a system shut off time between a termination of power generation by the fuel cell and a start-up of the first scavenging; conducting the first scavenging for the oxidant gas passage with the oxidant gas; and conducting the second scavenging for the fuel gas passage with the oxidant gas after a termination of the first scavenging. The first and second scavenging is conducted with the amount of the oxidant gas provided by the step of computing.

BRIEF DESCRIPTION OF THE DRAWINGS

FIG. 10 is a time chart showing timing for switching of scavenging.

DESCRIPTION OF THE PREFERRED EMBODIMENTS

Embodiments of the present invention are now described with reference to the drawings. It should be noted that although description will be given of a fuel cell system mounted on a vehicle in the following descriptions, it does not create any limitation but it is possible to versatilely apply the fuel cell system to vessels, airplanes and power generating systems of fixed use.

a. First Embodiment

Figure 1:
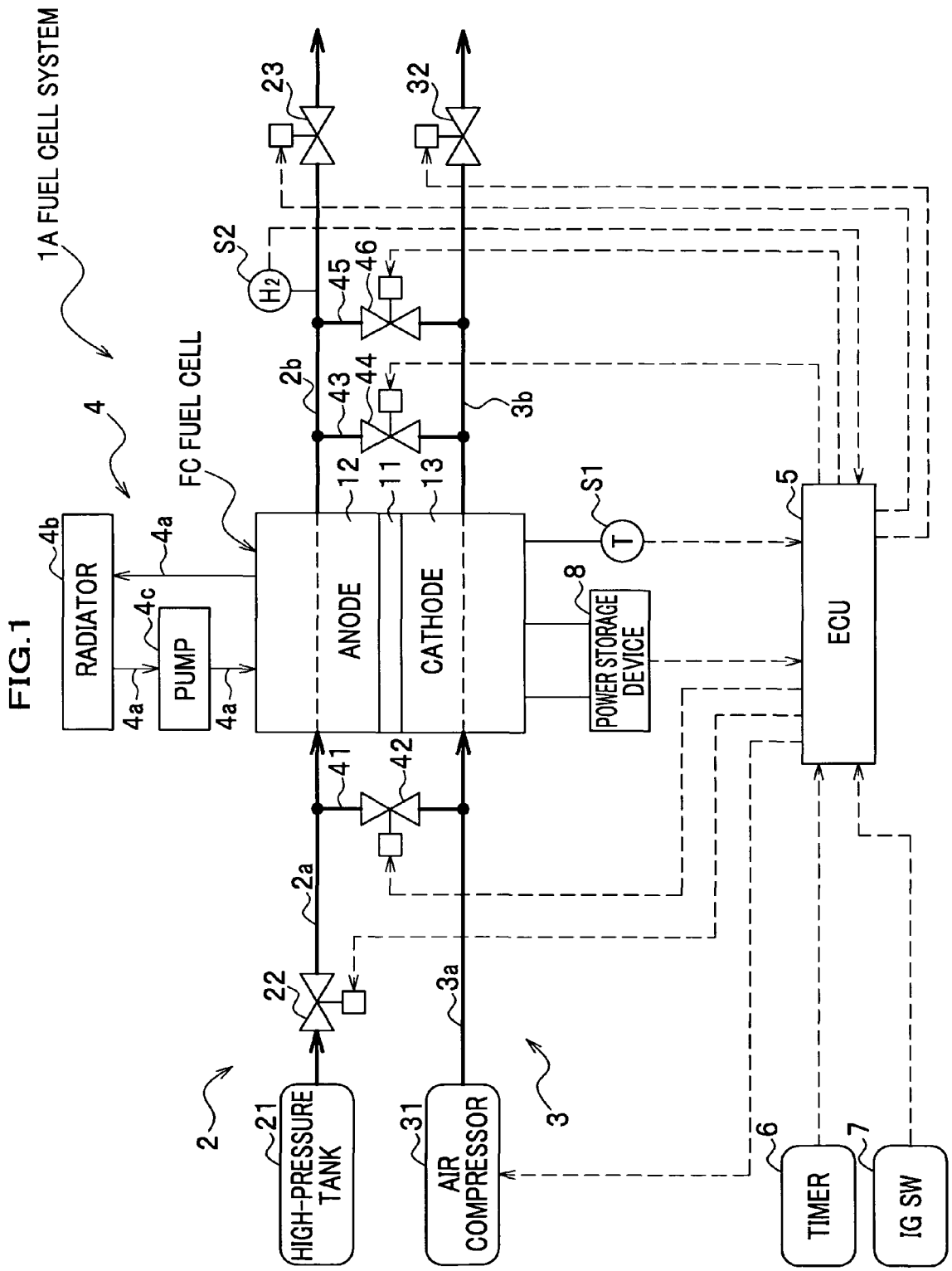
FIG. 1 is a block diagram showing an overall architecture of a fuel cell system.

As shown in FIG. 1, a fuel cell system 1A of a first embodiment of the present invention includes a fuel cell FC, an anode line 2, a cathode line 3, a cooling line 4, an electric control unit (ECU) 5, and the like.

The fuel cell FC is a Proton Exchange Membrane (PEM) fuel cell of a solid polymer type. The fuel cell FC includes a plurality of stacked cells, each including a Membrane Electrode Assembly (MEA) which is composed of an electrolytic membrane 11 interposed by an anode 12 which includes a predetermined catalyst and a cathode 13. A cell is further interposed by a pair of electrically conductive separators (not shown). When a hydrogen gas and air (oxygen gas) are supplied to the anode 12 and the cathode 13, respectively, hydrogen ions are generated at the anode 12 due to a catalytic action, which migrate to the cathode 13 through the electrolytic membrane 11. Electrons, which are generated in conjunction with the ions at the anode 12, move to the cathode 13 through an external load (traction motor, for example). The hydrogen ions and electrons having moved to the cathode 13 react with oxygen contained in air to generate water with a catalytic action provided by the cathode 13.

The anode line 2, which supplies the hydrogen gas as a fuel gas to the anode 12 or discharges it, includes an anode gas supplying line 2a, an anode gas discharging line 2b, a high-pressure hydrogen tank 21, a shut-off valve 22, a hydrogen purge valve 23 and the like.

One distal portion of the anode gas supplying line 2a is connected with an entrance side of the anode 12. One distal portion of the anode gas discharging line 2b is connected with an exit side of the anode 12. A flow passage of the anode gas supplying line 2a and a flow passage of the anode gas discharging line 2b communicate with an anode gas passage, which is provided in the separator (not shown).

The high-pressure hydrogen tank 21, which is able to store highly genuine hydrogen at a high pressure, 35 Mpa for example, is connected with the other distal portion of the anode gas supplying line 2a.

The shut-off valve 22, which has control over releasing and shutting off the hydrogen gas in the high-pressure hydrogen tank 21, is disposed in downstream of the high-pressure hydrogen tank 21. In this connection, it may be alternatively possible for the shut-off valve 22 to be integral with the high-pressure hydrogen tank 21 (in-tank type).

The hydrogen purge valve 23 is disposed in the anode gas discharging line 2b. When a concentration of hydrogen gas in the anode 12 falls during power generation due to a nitrogen gas contained in the air supplied to the cathode 13, which reaches the anode 12 permeating through the electrolytic membrane 11, the hydrogen purge valve 23 opens at regular intervals so as to prevent reduction in performance in terms of power generation.

It should be noted that although not shown, a regulator (pressure reducing valve) and an anode circulating line are disposed in downstream of the shut-off valve 22 of the anode line 2. The regulator adjusts a pressure of the high-pressure hydrogen gas discharged from the high-pressure hydrogen tank 21. The anode circulating line is provided so that an unreacted hydrogen gas discharged from the exit side of the anode 12 is circulated so as to return to the entrance side of the anode 12. It is possible to increase efficiency of hydrogen usage by introduction of the anode circulating line.

The cathode line 3, which supplies air as an oxidant gas to the cathode 13, includes a cathode gas supplying line 3a, a cathode gas discharging line 3b, an air compressor 31, an air back pressure valve 32 and the like.

One distal portion of the cathode gas supplying line 3a is connected with an entrance side of the cathode 13. One distal portion of the cathode gas discharging line 3b is connected with an exit side of the cathode 13. A flow passage of the cathode gas supplying line 3a and a flow passage of the cathode gas discharging line 3b communicate with a cathode gas passage, which is provided in the separator (not shown).

The air compressor 31, a supercharger, for example, is connected with the other distal portion of the cathode gas supplying line 3a. In this connection, the air compressor 31 regulates an amount of air to be supplied to the fuel cell FC as a result of controlling output power of a motor.

The air back pressure valve 32, which is able to provide variable valve opening, is disposed in the cathode gas discharging line 3b so as to control a pressure for the cathode 13.

It should be noted that although not shown, a humidifier, which is disposed in the cathode gas supplying line 3a, allows supplying of humidified air to the fuel cell FC. In this connection, the humidifier uses a cathode exhaust gas discharged from the cathode 13 as a source for humidification.

The cooling line 4 rejects heat into the atmosphere, which is generated by the fuel cell FC while generating power. The cooling line 4 includes a coolant circulating line 4a, a radiator 4b, a pump 4c and the like. One distal portion and the other distal portion of the coolant circulating line 4a are connected with an entrance side and an exit side of a coolant passage provided in the separator (not shown), respectively.

The fuel cell system 1A of the first embodiment further includes an air introducing line (communicating passage) 41, an air intake valve (communicating valve) 42, an air discharging line 43, an air discharging valve 44, a discharging line 45, a discharging valve 46, a temperature sensor S1, a hydrogen concentration sensor S2, a timer 6, an ignition switch (IGSW) 7 and a power storage device 8.

The air introducing line 41 provides connection between the anode gas supplying line 2a and the cathode gas supplying line 3a in upstream of the fuel cell FC. The air intake valve 42 has a function of shutting off a flow passage of the air introducing line 41.

The air discharging line 43 provides connection between the anode gas discharging line 2b and the cathode gas discharging line 3b. The air discharging valve 44 has a function of shutting off a flow passage of the air discharging line 43.

The discharging line 45, which is disposed in downstream of the air discharging line 43, provides connection between the anode gas discharging line 2b and the cathode gas discharging line 3b. The discharging valve 46, which has a smaller diameter than the hydrogen gas purge valve 23 and an air back pressure valve 32, is able to shut off a flow passage of the discharging line 45.

It should be noted that a combination of the air introducing line 41 and the discharging line 45 corresponds to the communicating passage in the appended claims, and a combination of the air intake valve 42 and the discharging valve 46 corresponds to a communicating valve in the appended claims.

The temperature sensor S1, which corresponds to a monitoring device in the appended claims, detects a temperature of the fuel cell FC. In this embodiment, the temperature sensor S1 is disposed in a portion of the anode gas supplying line 2a which is located adjacent to the entrance of the anode 12. The location of the temperature sensor S1 is not limited to what is described above, but it is possible to dispose the temperature sensor S1 in the following locations, for example: the anode gas discharging line 2b in the vicinity of the exit of the anode 12; the cathode gas supplying line 3a in the vicinity of the entrance of the cathode 13; the cathode gas discharging line 3b on the exit side of the cathode 13, or the cooling line 4.

The hydrogen concentration sensor S2, which is disposed in the anode gas discharging line 2b, detects a concentration of the hydrogen gas residing in the anode line 2. More specifically speaking, the hydrogen concentration sensor S2 detects the concentration of the gas remaining in the anode 12, the anode gas supplying line 2a and the anode gas discharging line 2b.

The timer 6 counts a system shut off time, which represents how long it has elapsed after a termination of power generation by the fuel cell FC. The ignition switch 7 has a function of terminating and starting up the fuel cell system 1A.

The power storage device 8, which is able to store electric energy generated by the fuel cell FC, includes batteries or capacitors, for example. As a battery, it may be possible to select a lead battery, a lithium ion secondary battery, a lithium polymer secondary battery, a nickel hydrogen battery, a nickel cadmium battery or the like. As a capacitor, it may be possible to select an electric double layered capacitor or an electrolytic capacitor.

The ECU 5, which includes a central processing unit (CPU), a memory, an input-output interface and the like, is electrically connected with the shut off valve 22, hydrogen purge valve 23, air compressor 31, air back pressure valve 32, air intake valve 42, air discharging valve 44, discharging valve 46, temperature sensor S1, hydrogen concentration sensor S2, timer 6, ignition switch 7, power storage device 8 and the like. The ECU 5 controls opening and closing of the shut off valve 22, hydrogen purge valve 23, air intake valve 42, air discharging valve 44 and discharging valve 46, output power of the motor for the compressor 31 and variable opening of the air back pressure valve 32. A system shut off time counted by the timer 6, ON and OFF signals delivered by the ignition switch 7, a concentration of the hydrogen gas detected by the hydrogen concentration sensor S2 and power (voltage) stored in the power storage device 8 are entered into the ECU 5.

Figure 3A:
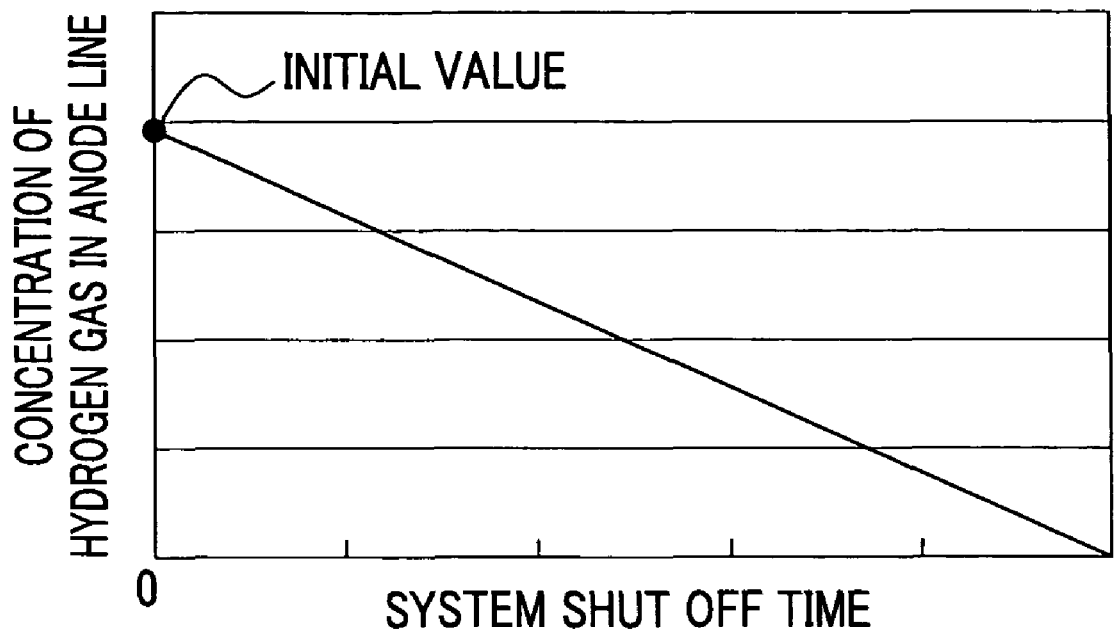
FIG. 3A is a map showing relationship between system shut off time and concentration of hydrogen gas remaining in an anode.
Figure 3B:
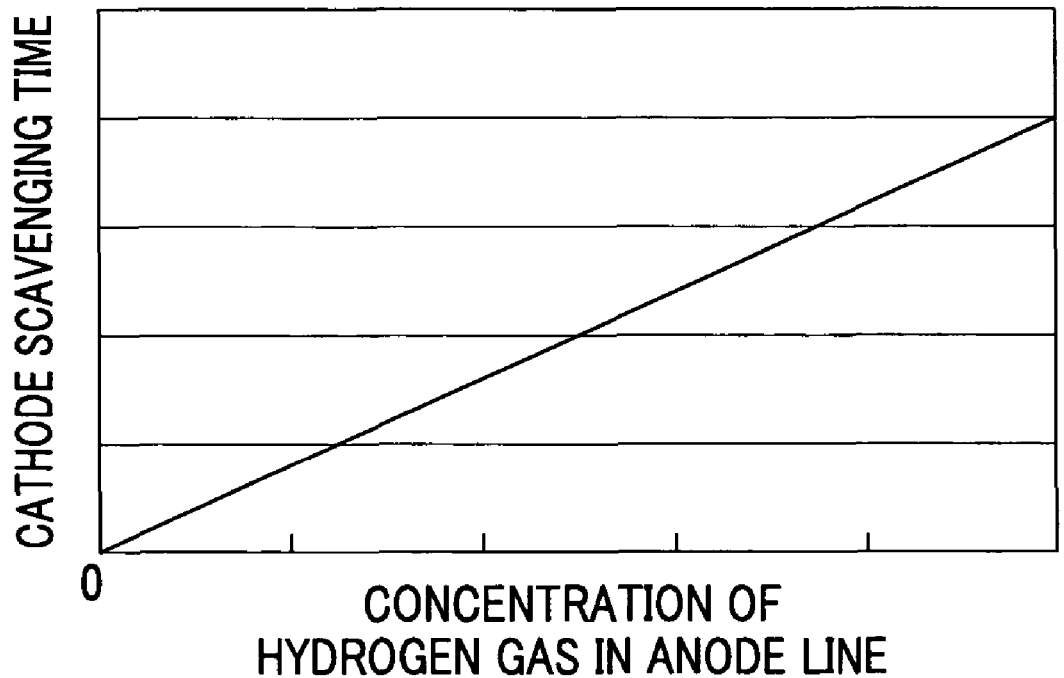
FIG. 3B is a map showing relationship between concentration of hydrogen gas remaining in the anode and a time period required for cathode scavenging.
Figure 4:
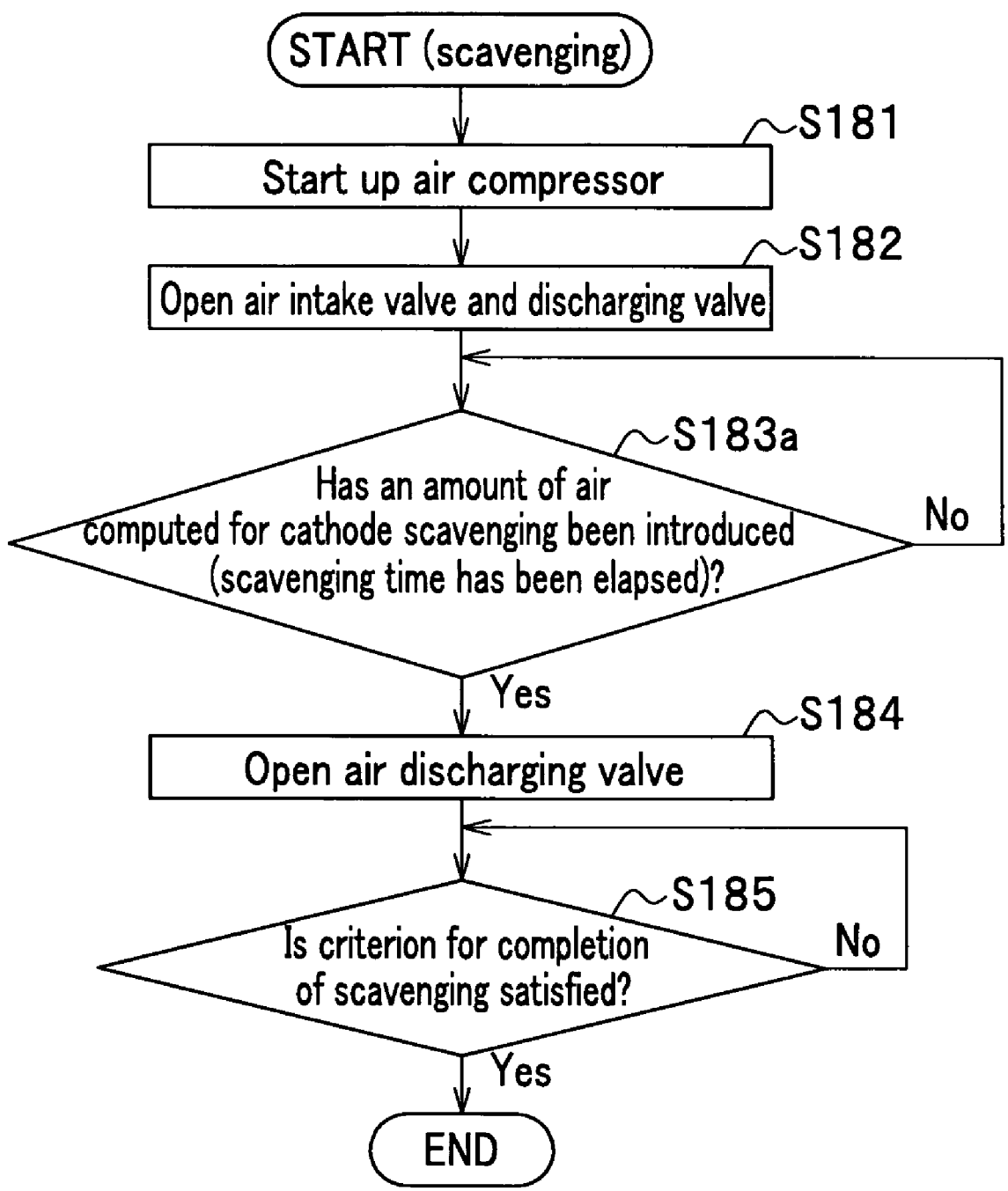
FIG. 4 is a sub-flow chart showing anode scavenging process.
Figure 5:
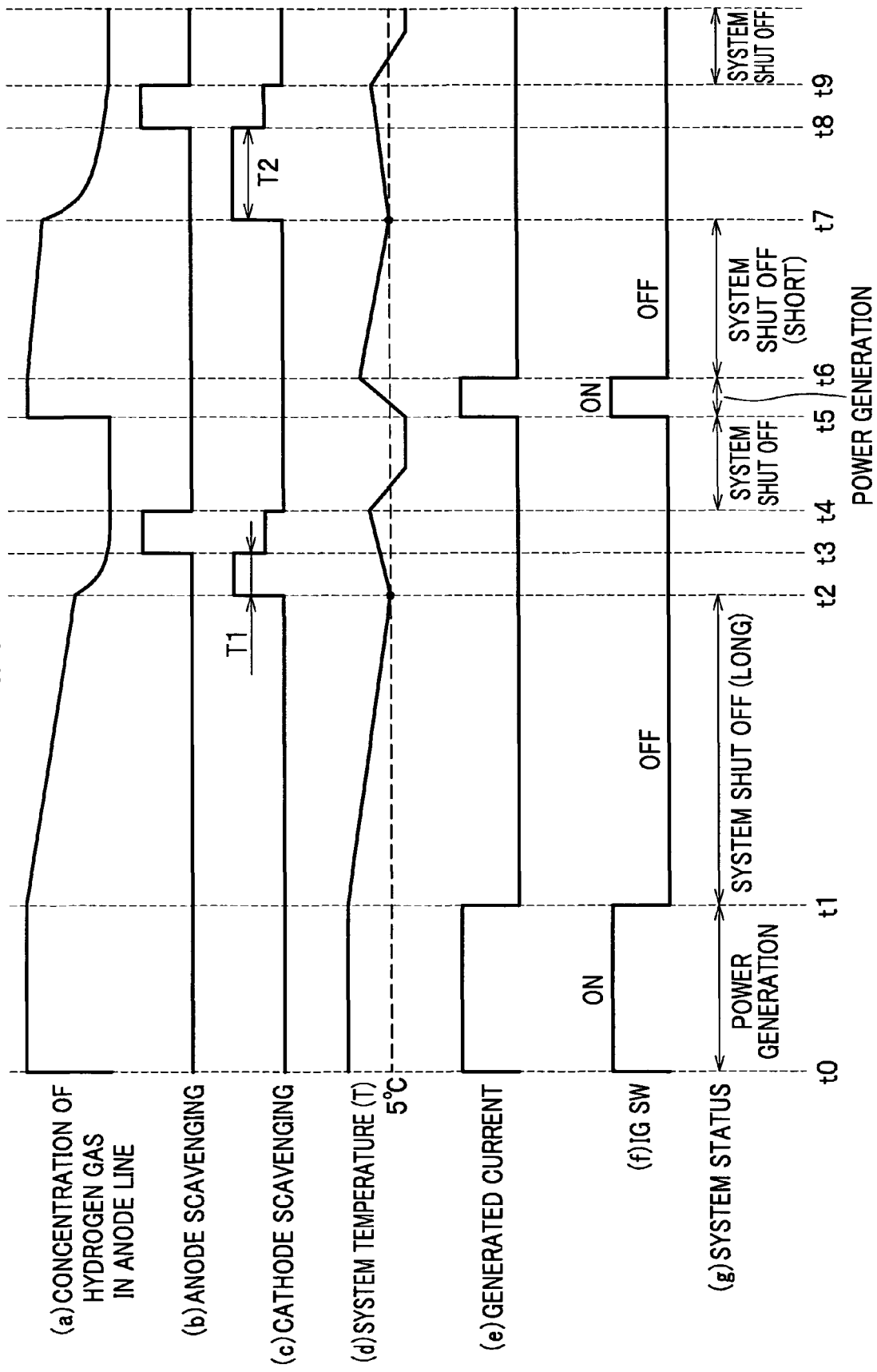
FIG. 5 is a time chart showing timing for switching of scavenging.

Description is now given of operation of the fuel cell system according to the first embodiment with reference to FIGS. 2-5. In FIG. 5, graphs (a) to (g) represent as follows. Graph (a) represents a history of concentration of the hydrogen in the anode line. Graph (b) represents timing of anode scavenging. Graph (c) represents timing of cathode scavenging. Graph (d) represents a history of temperature of the fuel cell system. Graph (e) represents a history of generated current. Graph (f) represents an ON/OFF status of the ignition switch. Graph (g) represents a history of status for the fuel cell system. In graph (c), a vertical axis represents an amount of supplied air.

Figure 2:
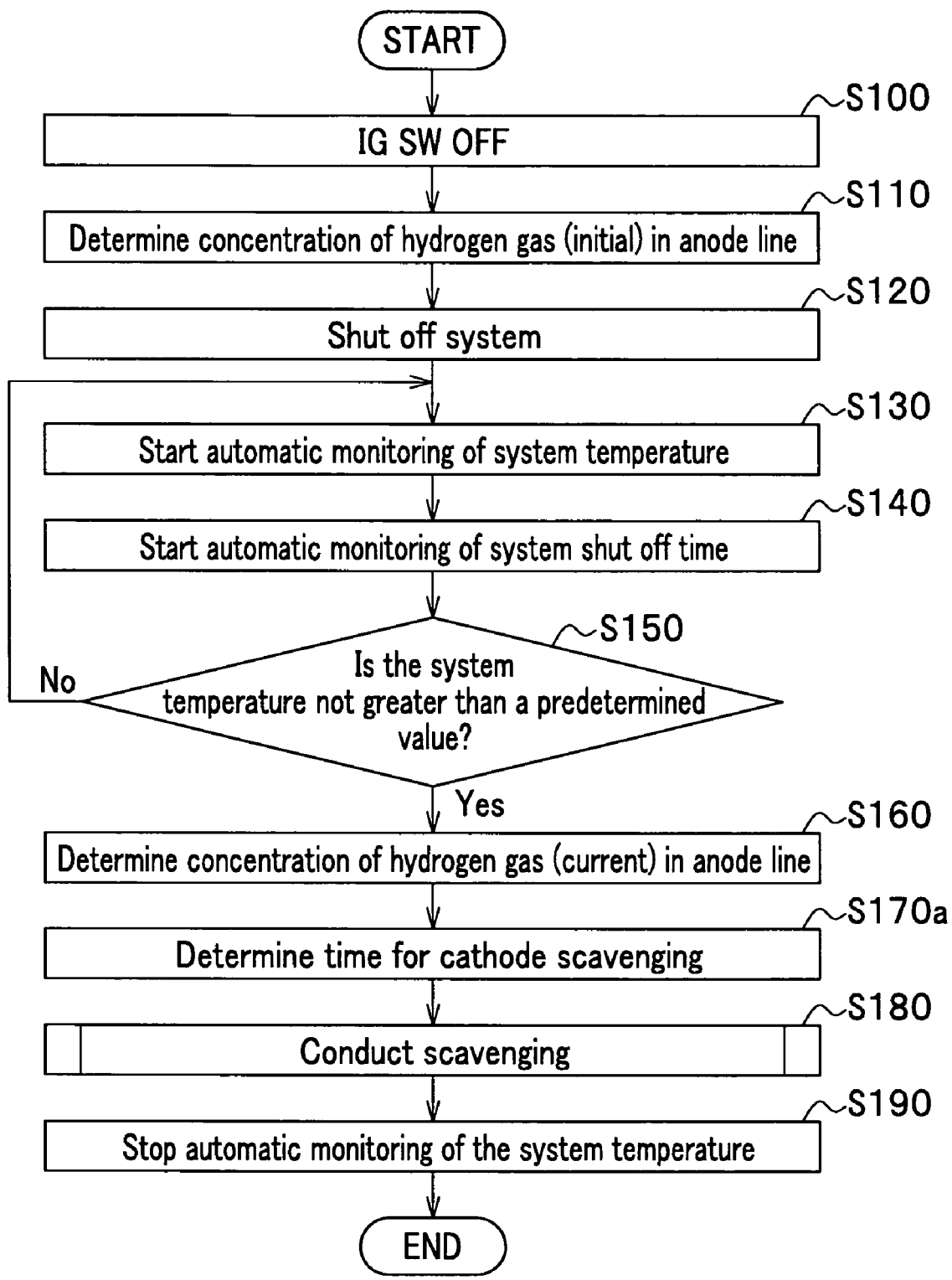
FIG. 2 is a flow chart showing scavenging process.

When the ignition switch 7 is turned off by a driver (step S100) as shown in FIG. 2, receiving a signal from the hydrogen concentration sensor S2, the ECU 5 determines an initial value for concentration of hydrogen gas within the anode line 2 (step S110). The ECU 5 sends not only an instruction for closing the shut off valve 22 so as to terminate supply of hydrogen gas to the anode 12, but also an instruction for stopping power supply to the air compressor 31 so as to terminate supply of air to the cathode 13, terminating power generation by the fuel cell FC (step S120).

After the termination of the fuel cell system 1A, the ECU 5 starts automatic monitoring of a temperature for the fuel cell FC (system temperature) (step S130). The ECU also starts up the timer 6 to conduct automatic monitoring of an elapsed time from a termination of power generation (system shut off time) (step S140). After starting processes of S130 and S140, the ECU determines whether or not the system temperature has fallen equal to or below a predetermined value (step S150). It may be preferable, but not necessarily, that the predetermined value is less than or equal to a temperature at which water contained in the fuel cell FC does not start freezing. If the system temperature is not less than or equal to the predetermined value in step S150 (NO), the ECU 5 continues automatic monitoring of the system temperature and the system shut off time. As shown in FIG. 5 (d), it may be that 5 degrees Celsius is selected for the predetermined value, for example, at which the fuel cell system is considered to be sufficiently cooled and it takes some time before water starts freezing. If the system temperature is less than or equal to the predetermined value in step 150 (YES), the ECU 5 determines a current concentration of the hydrogen gas in the anode line 2 according to a map shown in FIG. 3A. As shown in FIG. 3A, the concentration of the hydrogen gas in the anode line 2 decreases as the system shut off time increases. This phenomenon is due to the fact that a nitrogen gas contained in the air in the cathode 13 permeates through the electrolytic membrane 11 to the anode 12 and on the other hand the hydrogen gas remaining in the anode 12 permeates through the electrolytic membrane 11 to the cathode 13, which is called a cross leak.

After determining the current concentration of the hydrogen gas in the anode line 2 in step S160, the ECU 5 determines a time required for cathode scavenging, including the cathode 13, the cathode gas supplying line 3a and the cathode gas discharging line 3b, according to a map shown in FIG. 3B in step S170a. As shown in FIG. 3B, it is necessary to increase the time for cathode scavenging as the concentration of the hydrogen gas in the anode line 2 increases. The ECU 5 conducts scavenging in a flow shown in FIG. 4 (step S180).

As shown in FIG. 4, the ECU 5 starts up the air compressor 31 (step S181) and opens both the air intake valve 42 and the discharging valve 46 (step S182). At the same time, the ECU 5 controls the hydrogen purge valve 23 to close and the air back pressure valve 32 so as to have an opening necessary for scavenging. In this connection, it may be possible to start up the air compressor 31 simultaneously with opening of the air intake valve 42. Also it may be possible to start up the air compressor 31 first and open the air intake valve 42 after a pressure of the cathode 13 has increased. As to the timing of valve opening between the air intake valve 42 and the discharging valve 46, it may be possible to open them simultaneously, or to open the air intake valve 42 before the discharging valve 46.

The air supplied by the air compressor 31 is introduced into the anode 12 via the air introducing line 41, which gradually expels the hydrogen gas remaining in the anode 12 via the discharging valve 46. The expelled hydrogen gas, which is diluted as a result of merging with the air flowing through the cathode 13, is discharged into downstream of the air back pressure valve 32. In this way, scavenging described above (first scavenging) provides not only scavenging for the cathode 13 but also dilution of the hydrogen gas remaining in the anode 12 (see time t2 to t3 and t7 to t8 in FIG. 5A).

In step S183a, the ECU 5 determines whether or not an amount of air computed for cathode scavenging has been introduced: that is to say, whether or not the time determined for cathode scavenging in step S170a has elapsed. If the time for cathode scavenging has not elapsed (NO) in step S183a, the ECU 5 repeats processing of step S183a. If the time for cathode scavenging has elapsed (YES), the ECU 5 opens the air discharging valve 44 (step S184). When the air discharging valve 44 is opened, the air supplied by the air compressor 31 flows through the air introducing line 41, the anode gas supplying line 2a, the anode 12 and the anode gas discharging line 2b. Because the hydrogen purge valve 23 is closed, the air is discharged into downstream of the air back pressure valve 32 via the air discharging line 43 and the cathode gas discharging line 3b. In this way, the diluted hydrogen, water and the like remaining in the anode 12 are discharged. Scavenging described above (second scavenging) provides scavenging for the anode 12. It should be noted that a small portion of the air supplied by the air compressor 31 flows through the cathode 13 (see time t3 to t4 and t8 to t9 in FIG. 5C).

The ECU 5 determines whether or not a criterion for scavenging completion is satisfied (S185). As an example of the criterion, it may be possible to adopt a predetermined time. Also it may be alternatively possible to adopt a voltage range of the power storage device 8 so that the power required for the subsequent starting up can be assured. If the criterion is not satisfied (NO) in step S185, the ECU 5 repeats processing of step S185 until it is satisfied. If it is satisfied (YES), the ECU 5 closes the air intake valve 42, the air discharging valve 44 and the discharging valve 46, thereby finishing processing. Subsequently, the ECU 5 returns processing to the flow in FIG. 2 and stops automatic monitoring of the system temperature (step S190).

As shown in FIG. 5 for example, when a system shut off time (t1 to t2) after turning off time (t1) of the ignition switch 7 is long, cathode scavenging is conducted for a time period T1 (t2 to t3) first and then anode scavenging is conducted for a given time period (t3 to t4). When a system shut off time (t6 to t7) is short, in contrast, cathode scavenging is first conducted for a time period T2 (t7 to t8), which is greater than the T1, and then anode scavenging is conducted for a given time period (t8 to t9). The control described above is based on the fact that it may be possible to determine that an amount of hydrogen gas permeating to the cathode 13 due to a so-called cross leak is great when a system shut off time is long, but small when it is short. In this way, it is possible to prevent unnecessarily long scavenging for the cathode when the system shut off time is long. This enables a reduction in power supplied to the air compressor 31, contributing to a reduction in power consumption of the fuel cell system 1A.

b. Second Embodiment

Figure 6:
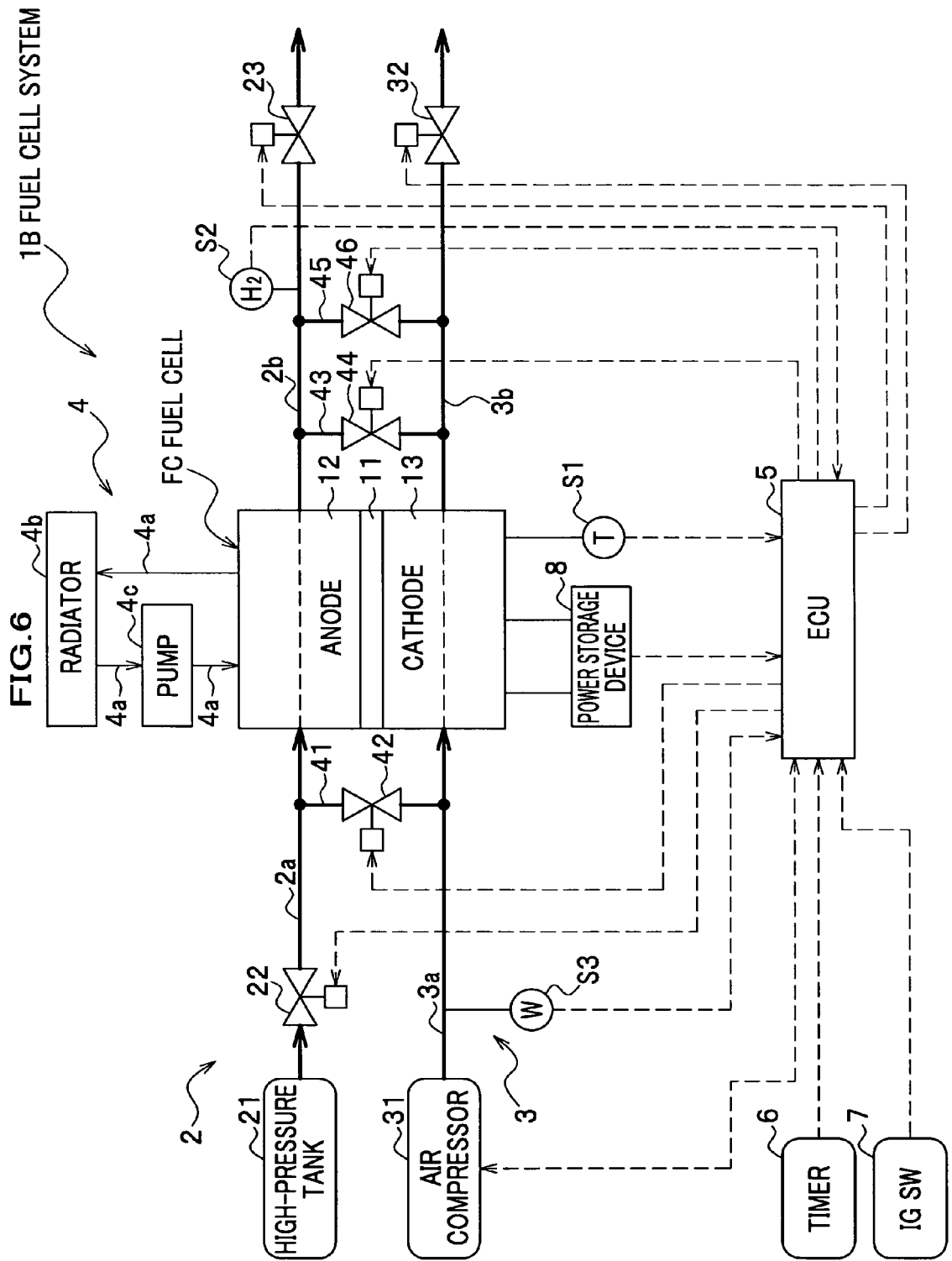
FIG. 6 is a block diagram showing an overall architecture of a fuel cell system.

As shown in FIG. 6, a fuel cell system 1B according to a second embodiment of the present invention includes an additional device, a flowmeter S3, which is disposed in a cathode gas supplying line 3a. As the fuel cell system 1B is structurally similar to that of the first embodiment except for the flowmeter S3, description on other components will not be repeated, bearing the same symbols. The flowmeter S3, which is electrically connected with an ECU 5, detects a flow rate of air supplied by an air compressor 31, sending a signal indicative of the flow rate to the ECU 5.

Figure 7:
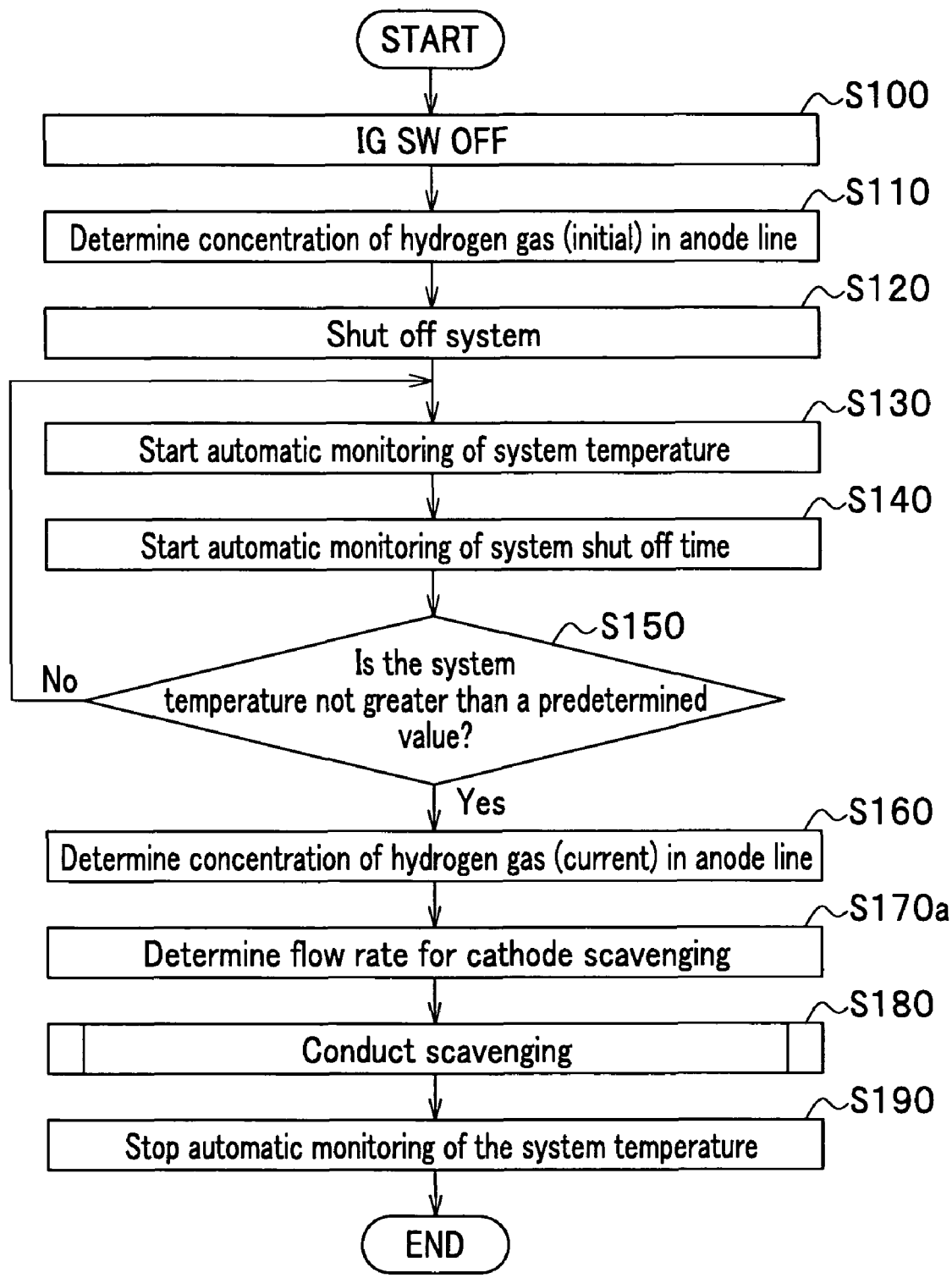
FIG. 7 is a flow chart showing scavenging process.
Figure 8A:
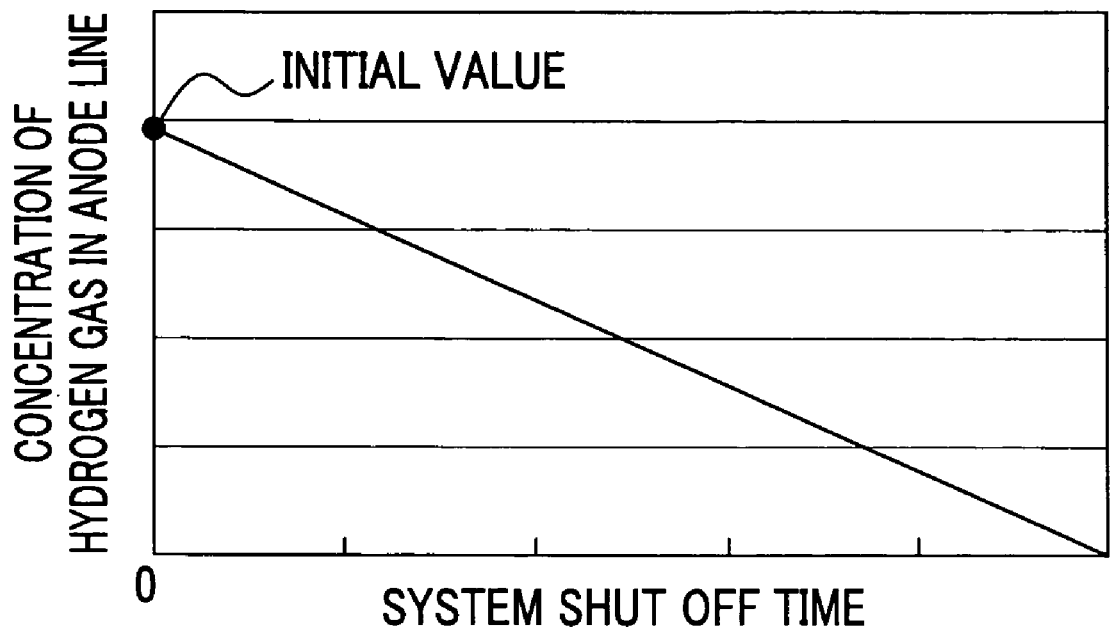
FIG. 8A is a map showing relationship between system shut off time and concentration of hydrogen gas remaining in an anode.
Figure 8B:
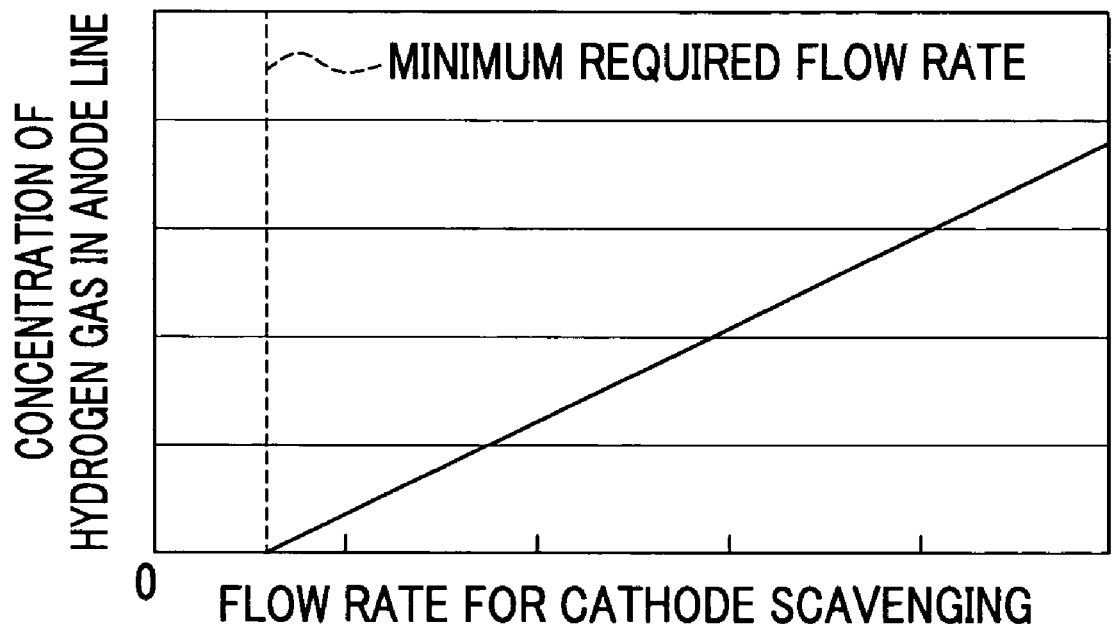
FIG. 8B is a map showing relationship between concentration of hydrogen gas remaining in the anode and a time period required for cathode scavenging.
Figure 9:
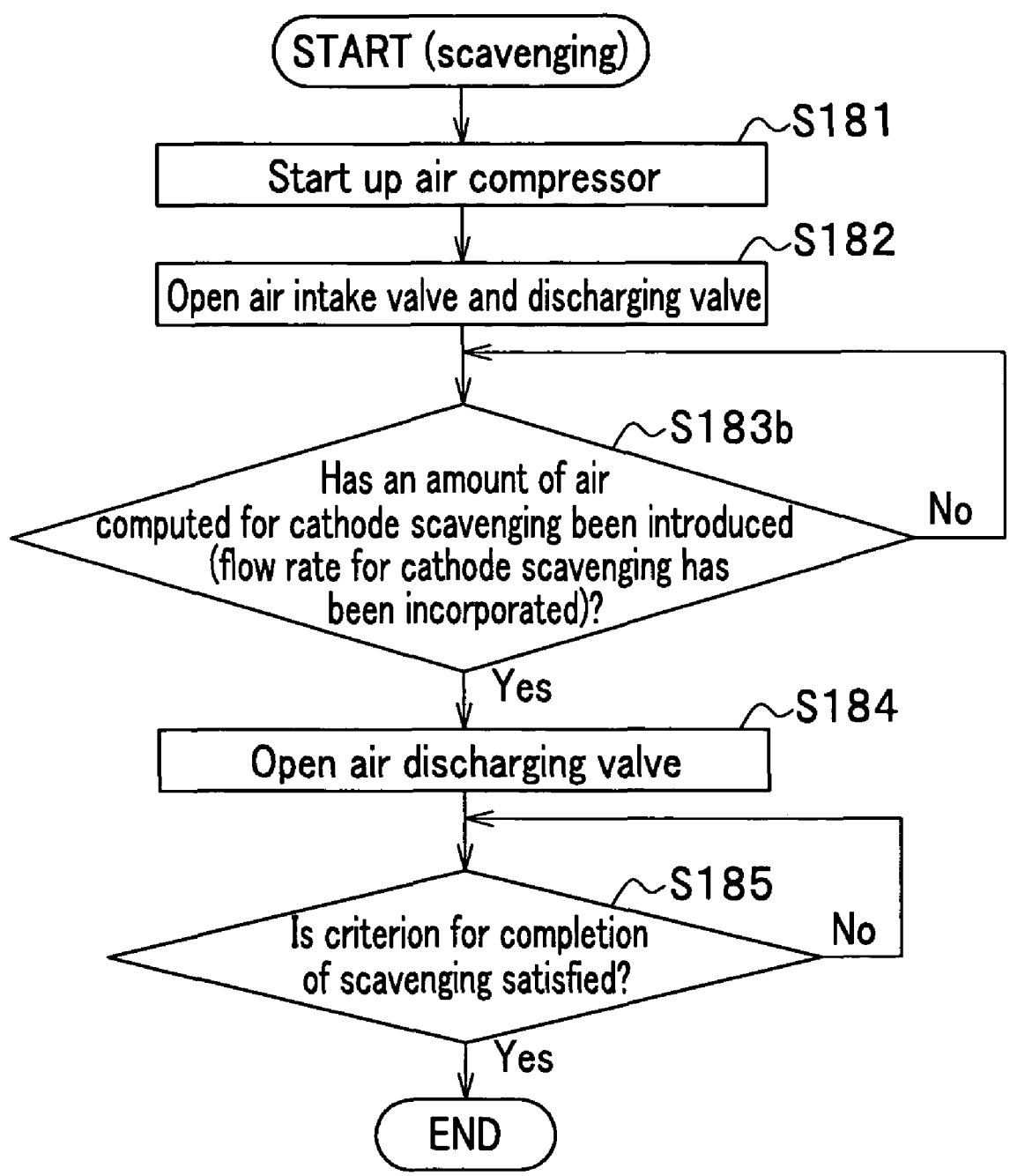
FIG. 9 is a sub-flow chart showing anode scavenging process.

Description is given of scavenging process conducted by the fuel cell system 1B according to the second embodiment with reference to FIGS. 7 to 10. It should be noted that a flow shown in FIG. 7 is similar to that in FIG. 2 of the first embodiment except for a step S170b replacing a step S170a. Also, a flow shown in FIG. 9 is similar to that in FIG. 4 except for a step S183b replacing a step S183a. For these reasons, description is focused on processes in a step S160 and after.

In step S160, the ECU 5 acquires a current concentration of hydrogen gas within an anode line according to a system shut off time using a map shown in FIG. 8A. The ECU 5 then determines a flow rate for cathode scavenging according to the current concentration of hydrogen gas. In step S180, the ECU 5 moves processing to a sub-flow in FIG. 9, starting up the air compressor 31 (step S181) and opening an air intake valve 42 and a discharging valve 46 (step S182). In a step S183b subsequent to these steps, the ECU 5 determines whether or not the flow rate for cathode scavenging obtained in step S170b has been duly incorporated. Subsequent processes are similar to those of the first embodiment.

As shown by a cathode scavenging schedule (c) in FIG. 10 for example, when a system shut off time (t1 to t2) after turning off of an ignition switch 7 is long, cathode scavenging is conducted for a given time period T3 (t2 to t3) with a smaller flow rate W1. Subsequently, anode scavenging is conducted for a given period of time (t3 to t4). When a system shut off time (t6 to t7) is short, cathode scavenging is conducted for a given period of time T3 (t7 to t8) with a flow rate W2 greater than the flow rate W1. Subsequently, anode scavenging is conducted for a given period of time (t8 to t9). Because it is determined that a larger amount of hydrogen gas permeates to a cathode 13 due to a so-called cross leak (an amount of hydrogen remaining in an anode 12 is smaller) when a system shut off time is longer, the ECU 5 sets a smaller value for the flow rate W1 for cathode scavenging. In contrast, when the system termination period is shorter, the ECU 5 sets a larger value for the flow rate W2, since it is determined that a smaller amount of hydrogen gas permeates to the cathode 13 (an amount of hydrogen gas remaining in the anode 12 is larger). In this way, it is possible to prevent cathode scavenging with an unnecessarily large flow rate when the system shut off time is long. This enables a reduction in the power supplied to the air compressor 31, contributing to a reduction in power consumption of the fuel cell system 1B.

As described above in the first and second embodiments, an amount of air required for cathode scavenging (first scavenging) is controlled according to the system shut off time. More specifically speaking, a time period and a flow rate for scavenging are controlled in the first and second embodiments, respectively. It is not limited to what is described above, but it may be alternatively possible to control a total amount of air necessary for the cathode scavenging (first scavenging) and the anode scavenging (second scavenging). Also it may be alternatively possible that the second scavenging is conducted for the anode with an amount of air greater than that of the first scavenging. Instead of maps shown in FIGS. 3 and 8 as examples, it may be possible to adopt functions or tables.

It may be possible to adopt a discharging valve 46 which has a smaller discharging capability than an air discharging valve 44. In this case, the ECU 5 opens the discharging valve 46 in addition to the air intake valve (communicating valve) 42 during the first scavenging. The ECU 5 opens at least the air discharging valve 44 in addition to the air intake valve 42 during the second scavenging.

Foreign priority document, JP2005-219225 filed on Jul. 28, 2005 is hereby incorporated by reference.

What is claimed is:

1. A method for scavenging a fuel cell system which comprises a fuel gas passage through which a fuel gas flows, an oxidant gas passage through which an oxidant gas flows, and a communicating passage and a communicating valve so as to selectively allow the fuel gas passage and the oxidant gas passage to communicate with each other, the method comprising the steps of:

monitoring a state transition of the fuel cell after a termination of power generation;

opening the communicating valve so as to open the communicating passage when a signal indicative of the state transition meets a predetermined criterion;

computing an amount of an oxidant gas required for first and second scavenging according to a system shut off time between a termination of power generation by the fuel cell and a start-up of the first scavenging, wherein the amount of oxidant gas required for the first scavenging is computed to be a smaller amount as the system shut off time becomes longer;

conducting the first scavenging for scavenging the oxidant gas passage with the oxidant gas as well as for diluting a remaining hydrogen gas in the fuel as passage; and conducting the second scavenging for the fuel gas passage with the oxidant gas after a termination of the first scavenging, wherein the first and second scavenging is conducted with the amount of the oxidant gas provided by the step of computing.

2. A method according to claim 1, further comprising the step of adjusting an amount of the oxidant gas required for the first scavenging according to the system shut off time.

3. A method according to claim 1, wherein monitoring the state transition of the fuel cell is in a form of temperature of the fuel cell.

4. A method according to claim 3, wherein the criterion is less than or equal to a predetermined temperature at which water contained in the fuel cell does not start freezing.

5. A method according to claim 1, wherein the first scavenging is applied to a remaining hydrogen gas in a fuel electrode of the fuel cell in addition to the oxidant gas passage.

6. A method according to claim 1, wherein the second scavenging provides a larger amount of scavenging for the remaining hydrogen gas in the fuel electrode than the first scavenging.

7. A method according to claim 6, wherein the fuel cell system further comprises:

a first discharging valve for discharging a gas in the fuel electrode, and a second discharging valve for discharging gas in the fuel electrode, the first discharging valve having a larger discharging capability than the second discharging valve; and wherein the first scavenging is conducted with the second discharging valve and the communicating valve opened, and the second scavenging is conducted with at least the first discharging valve and the communicating valve opened.

8. A method according to claim 1, wherein the amount of the oxidant gas required in the first and second scavenging is adjusted by changing a scavenging time.

9. A method according to claim 1, wherein an amount of the oxidant gas required for scavenging is adjusted by a flowmeter for detecting a flow rate of air supplied by an air compressor.

* * * * *